United States Patent [19]
Schwartz

[11] 3,741,844
[45] June 26, 1973

[54] HOT MELT PROCESS FOR FORMING RESIN LAYER ON POLYURETHANE FOAM
[75] Inventor: A. William Schwartz, Larchmont, N.Y.
[73] Assignee: Tenneco Chemicals Inc., Saddle Brook, N.J.
[22] Filed: June 3, 1971
[21] Appl. No.: 149,689

[52] U.S. Cl............ 156/244, 117/138.8 D, 264/45, 264/47
[51] Int. Cl. ............................................. B29c 3/00
[58] Field of Search................... 156/244; 161/190; 264/176 R, 45, 47, 48; 117/DIG. 9, 138.8 D

[56] References Cited
UNITED STATES PATENTS
3,669,794  6/1972  Mazur............................. 156/244
3,223,568  12/1965  Alderfer......................... 156/282 X
3,470,055  9/1969  Wade.................................. 156/244
3,371,002  2/1968  Reddeman......................... 156/244
3,402,086  9/1968  Smith et al....................... 156/244
3,620,898  11/1971  Harris et al...................... 156/244
3,657,036  4/1972  Mullenhoff et al................. 264/47

FOREIGN PATENTS OR APPLICATIONS
1,591,995  12/1970  France............................. 156/244

Primary Examiner—Alfred L. Leavitt
Assistant Examiner—Caleb Weston
Attorney—Evelyn Berlow, James P. Scullin et al.

[57] ABSTRACT

A process for laminating a polyolefin resin onto a polyurethane foam is provided by this invention. The resin is melted and the molten resin is flowed onto the foam and cooled.

10 Claims, 1 Drawing Figure

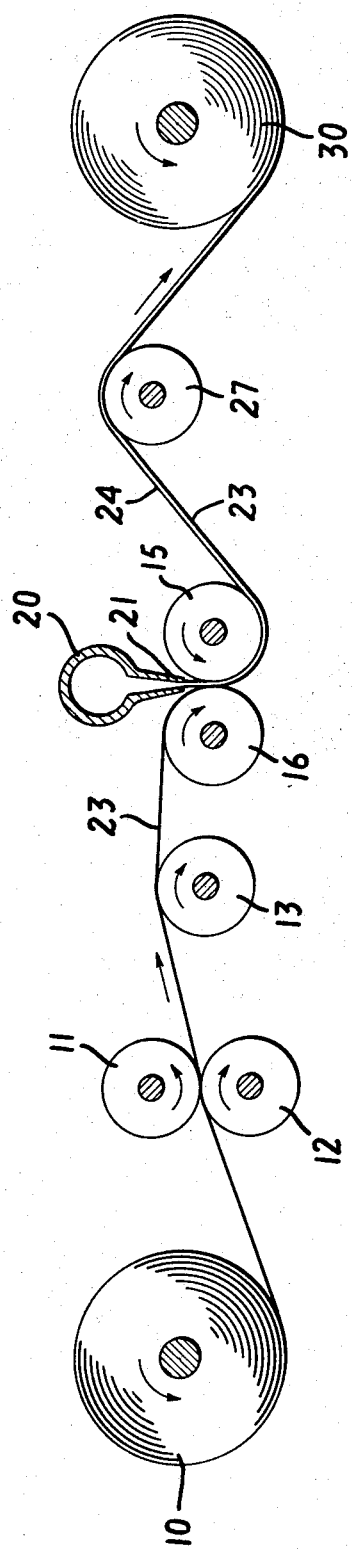

HOT MELT PROCESS FOR FORMING RESIN LAYER ON POLYURETHANE FOAM

Polyurethane foam has found a wide variety of uses ranging from cushions, including mattresses and pillows, to structural members to interlining for clothing. The properties of these foams vary according to the uses to which the foams have been put and range from the highly flexible foam used for mattresses or in clothing interlining to the rigid and semirigid foams used in structural members or sound insulators. For many uses, it is desirable to seal off or cover the top surface of the polyurethane foam with a generally smooth continuous layer of material such as a resinous plastic film. The surface material can be transparent or opaque and can be white or colored with various pigments. The film increases surface slip and decreases or eliminates porosity.

Perhaps the most significant use for the foam-film laminate lies with thin strips, or webs, of polyurethane foam. Such material is commercially most economically made by "peeling," or slicing, the thin strips as a continuous strip from buns, or slabs, of foam, casting the foam as a thin strip being generally considered too inefficient.

The problems that have arisen, however, in laminating or applying a coating or film of an olefin polymer resin on to the polyurethane foam have made it extremely difficult to form a tight, strong bond between the foam and film or coating without the use of adhesives.

The use of adhesives, however, introduces an extra step in the process of preparing the laminated products and requires the use of additional material. The attempts to form a direct bond between olefin and urethane polymers, especially polyethylene, have not been notably successful for technical and economical reasons. One method for bonding film to foam has been flame laminating wherein one of a prepared film and foam is exposed to an open flame in order to soften the surface thereof, and the two layers are then pressed together. Flame laminating results in loss of material, possibly burning and charring and most significantly perhaps loss of additives, including stabilizers and anti-burning agents which would substantially degrade the properties of the material.

The art has not found similar difficulties with other resins. For example, PVC resin has been directly bonded to polyurethane foam as disclosed in U.S. Pat. No. 3,223,568 to Alderfer. Alderfer discloses heating preformed plastic film, pressing the film against a surface of a foam in order to obtain a direct bond. Alderfer indicates that other resins, including ethylene polymers, can be treated in this manner. The art recognized the additional problems when using polyethylene, as is set forth in U.S. Pat. No. 3,533,901 to Sutker.

Sutker discloses a method for directly laminating polyethylene to polyurethane. Sutker discusses the necessity of first oxidizing the outer layer of the polyethylene film before the polyethylene would adhere to the polyurethane foam. In order to obtain such oxidation, Sutker suggests the hot-melt extruding of the polyethylene film in air, which will inherently form an oxidized layer on this surface. Sutker, as did, Alderfer, used a preformed polyethylene film. Sutker, however, considered it necessary to foam in situ in order to obtain a strong bond. Sutker formed the laminate by spreading a thin layer of a foamable polyurethane resin on a preformed surface-oxidized polyethylene film, causing the foaming of the polyurethane in situ. The polyurethane foam was then cured at elevated temperatures which at the same time formed the bond with the polyethylene film.

In U.S. Pat. No. 2,983,962 to Merz et al., the concept of immediately applying a foamable resin liquid onto a freshly extruded thermoplastic resin sheet is disclosed. Immediately covering the resin surface with foam could inhibit the surface oxidation considered by Sutker to be necessary to form an adherent bond between polyethylene film and polyurethane foam.

A problem encountered with the use of unpigmented or lightly pigmented foam in applications where foam is visible, is discoloration. The original almost pure white foam rapidly discolors to a dingy yellow due to air - and light - induced degradation. The use of additives has not been completely successful because many common antioxidants are driven off during the high temperature foaming operation. The surface addition of stabilizer after foaming is expensive and not uniformly successful. Accordingly, a simple direct method of color stabilizing polyurethane foam would be most useful.

Accordingly, the present invention provides a surprisingly simple but effective method for applying a protective layer of an olefin polymer onto a polyurethane foam substrate by directly coating with a hot melt of an olefin polymer. The process comprises preferably the hot melt extruding of a layer of an olefin polymer, such as polyethylene, directly onto the surface of a polyurethane foam substrate, followed by cooling the olefin polymer layer to solidify the layer on the foam substrate and simultaneously form a tightly adhering bond. To improve the bond between the foam and layer, pressure can be exerted on the laminate during cooling of the layer. The pressure should be sufficient to bond without destroying the foam structure or, unless desired, causing a thinning out of the extruded layer. The layer, or film, can be extruded directly onto the foamed surface at the desired thickness.

The directly extruded laminate of the present invention forms such a tight, strong bond with the foam surface that it effectively excludes air and light, acting as a protective barrier against surface degradation or discoloration, and resisting delamination. In addition, there is believed to be a migration of stabilizer additives and possibly other moieties, from the molten layer to the foam. This results in an unexpected dividend from this process for forming the laminate.

The polyurethane foam substrate can be in the form of slabs of any shape, having either curvilinear or flat surfaces. Preferably, however, this procedure results in the greatest advantage when dealing with a polyurethane foam web, or thin strips, for example of the type formed by "peeling" the large commercially-produced buns. The thin, peeled web is wound on rolls. In carrying out the process of the present invention, a roll of foam web is unwound and the web passed adjacent, e. g., a polyethylene, extruder. The polyolefin is directly extruded onto the foam peeling surface. If desired, both faces of the thin foam web can be laminated, either simultaneously by parallel extruders or sequentially by tandem extruders. In either case, the surface on to which the polyolefin is extruded is substantially sealed against air and also is protected from degradation due to light.

If desired, however, the polyolefin film can be porous, in such case, of course, the foam surface would not be sealed against air.

The advantages to be obtained by the laminating of a polyolefin film onto polyurethane foam are many fold. When the porous nature of the usual flexible foams is undesirable and it is necessary to prevent moisture or liquid from entering the body of the foam, a nonporous film can be applied. The advantage of having a surface having a greatly increased degree of "slip," or a lower coefficient of friction can be obtained by the lamination of a thin film. Such a laminate can be used, for example, as the interlining of clothing. The slippage is important for comfort, to permit sliding, e. g., the arm, in and out of the sleeves. However, a nonporous lining would be clammy and uncomfortable in a garment so that for such purposes, a very thin porous polyethylene film could be used over an open-celled foam.

The process of this invention can be applied to generally any type of polyurethane foam, both open celled and closed celled. Frequently, the closed-cell foams are rigid or semi-rigid types. Such foams have a fairly high structural strength. So-called "open" foams vary from having only a small number of cells which are open, i.e., 10–30 percent, to completely reticulated foamed materials. The polyurethane foams can be prepared from the polyether and polyester type polyurethanes, which are in most common use commercially, as well as any other type of urethane polymers. Other examples include polyurethane obtained by the reaction of an organic diamine with a bishalorformate of a glycol or of a polyalkalene glycol, such as described in U.S. Pat. No. 2,929,802 issued Mar. 22, 1960 to Katz. The latter type is generally prepared with an added blowing agent to obtain the desired density foam. Examples of other, rigid-type resins are disclosed in Japanese patents Nos. 68/17,592 and 68/08,839.

In the preferred procedure for carrying out this invention, a strip or continuous web of polyurethane foam is utilized as a substrate and is coated with a film or sheet of polyolefin. The web is passed continuously beneath the extrusion coating die. Such foam is generally of the open-cell variety having at least 30 percent and generally 50 percent of its cells open and connected. The common commercial procedure for preparing such web of foam is by the peeling of a large elongated, generally cylindrical, shaped bun of the foam. The cylindrical foam buns can be prepared, for example, in accordance with the procedures set forth in U.S. Pat. Nos. 3,281,894 and 3,296,658 to Buff et al. The cylindrical slabs are then placed on a spindle and peeled by being placed in motion relative to a peeling knife. The peelings can be of any desired thickness ranging from a practical minimum of approximately 0.035 inch. There is actually no maximum thickness, as slabs or blocks of foam can also be laminated using the present invention. However, usually a peeled web is not prepared more than 0.5 in. thick.

In carrying out this preferred aspect of this invention, a web of polyurethane foam can be passed between two nip rolls. Immediately adjacent, and generally above, the web, an extrusion coating die, is placed such that the hot molten polyolefin extruded from the die immediately falls on to the foam surface, preferably immediately before the foam enters the nip rolls. The surface of the polyolefin in contact with the foam is thus exposed to the air only instantaneously before coating the urethane foam and is in a substantially molten or semi-molten, extruded condition as it passes between the nip rolls, so that it is readily pressed on to the surface of the foam. The nip rolls preferably include a cooler roll, which has a release surface, such as Teflon, and is in direct contact with the hot polyolefin layer for quickly cooling the film and causing it to form a permanent bond with the polyurethane. The pressure roll in direct contact with the foam is usually a rubber covered support roll. The two rolls can optionally be smooth or matted or otherwise embossed so as to obtain the desired finish on the polyethylene film surface. Alternative methods of carrying out the extrusion lamination include, for example, the use of an air knife and the concomitant procedures set forth by Pacquin et al. in U.S. Pat. No. 3,161,560.

The olefin polymer is generally extruded from the die at a temperature sufficient to render it molten and to preferably remain molten, or at least heat-tacy or semi-molten, until it is deposited onto the urethane foam. Polyethylene, for example, requires generally a temperature in the range of from about 275° to 650° F, in the extrusion nozzle, preferably, for low density polyethylene, at least about 310° to 320° F. The polyolefin melt temperature in the extruder is generally permitted to be no greater than necessary depending upon the nature of the polymer, that is, molecular weight, structure, density and viscosity, among others, and is also limited by the linear speed at which the extruded product is applied to the foam (extrusion rate), and the shape and thickness of the extruded product. Generally, a temperature towards the lower end of the above-cited range is recommended where a thin film is to be applied and a higher temperature is useful for obtaining a thicker coating or shaped object. Similarly, the faster the speed with which the extrusion is carried out the higher can be the temperature. The maximum temperature is limited by the degradation point of the olefin polymer. Too low a temperature could result in the formation of a discontinuous layer which would not be commercially useful.

Generally, polyolefin films of from about one-eighth to about 20 mils can be readily extruded with between about one-half to about 20 mils thick film being most preferred. However, if desired, polyolefin layers of substantially any desired shape or thickness can be formed. For example, the polyolefin can be extruded in the shape of a continuous block or profile, such as an I-beam which can be bonded onto a sheet or block of polyurethane foam; the foam can be flexible, semi-rigid or rigid.

If it is desired to extrude a thin film, generally one less than about 10 mils, the film is extruded from the nozzle slit at a greater thickness, e.g., 15 mils, and then is "drawn down" by operating the windup and pressure rolls, and thus moving the foam substrate, at linear speeds greater than the extrusion rate; this creates a tension on the film, causing it to stretch and then become thinner, and narrower. This is a conventional technique and the manner of compensating for the narrowing of the film is also well known.

One advantage of the present extrusion-lamination process is the rate at which a given web of foam can be laminated to a polyolefin, and the fact that a thinner gauge foam can be laminated. In the present process, the laminating can be readily carried out at a rate of 1,000 feet per minute or faster, whereas in, e.g., adhesive laminating, only about 15 feet per minute can be laminated. Flame lamination, another previously used commercial process, has a maximum practiced rate of approximately 400 feet per minute.

The linear speed of the extrusion lamination process of this invention is limited only by the rate at which the foam can be passed beneath the die and through the nip rolls. When utilizing a foam web, this is generally a function of the speed at which the web can be unwound and then rewound on a rewind roll. This in turn is limited by the tension that can be applied to the foam by the equipment available for handling the foam web. Extrusion equipment can be prepared where the speed at which the polymer extruded from the die is practically unlimited and is not a limiting factor in the speed of this operation. The flame lamination is limited by the time needed to pass the urethane foam or polyolefin sheet over the flame, whereas the adhesive process is limited by the time required to apply the adhesive to the laminar layers. In each case they are substantially slower than the period for extruding a continuous film and, therefore, those processes each have a limiting factor not present in the present process.

Methods of extrusion coating with various polymers are known and include the extrusion-coating of substrates such as metal foil, plastics, foam, paper, cellophane, leather, etc. disclosed by Smith et al. in U.S. Pat. No. 3,402,086 with an ethylene-acrylic acid copolymer. These same methods can surprisingly be applied to the laminating of an olefin polymer to polyurethane foam.

The olefin polymer can be in dense form or as a foam. In any case, the polyolefin is applied in the heat-softened molten or semi-liquid condition to form a firmly bonded layer to the polyurethane foam.

The extrusion of a foamable olefin polymer is readily done by methods well known to the art, such as the process described in the authoritative text by Calvin J. Bennings, *Plastic Foams*, Vol. I, pp. 4–36, 264–281, 315 (Wiley-Interscience, 1969). The extruded foamed polymer is applied to the polyurethane foam while in the heat-softened, semi-liquid stage and is, therefore, handled in the same manner as the unfoamed layer, including passing the laminate between two nip rolls, one of which is a chill roll.

Although polyethylene is the generally preferred olefin polymer for use in laminating the urethane foam, this is primarily because of its ready availability and extrudability on a commercial basis. However, polypropylene would be preferred where a heat-sterilizable product is needed. Generally, any of the other lower alpha-olefinic polymers and mixtures thereof can be utilized, such as polymers of butene, isoprene and 2-methylhexene. "Olefin polymers" include the polymers of aromatic-substituted olefins such as the phenyl-substituted olefins: styrene and the vinyl toluenes, and of halogen-substituted olefins, such as vinyl chloride. Generally, polymers of olefins of two to nine carbon atoms are most useful; olefins of two to five carbon atoms are most preferred. The benefits of the present invention can also be obtained using olefin copolymers containing at least about 60 percent by wt. polymerized olefin monomers and polymer mixtures where the olefin polymer forms at least about 60 percent by wt. of the polymer. Copolymerizable monomers, useful with the olefins, include acrylate and alkacrylate esters and acids, and vinyl halides and vinyl esters. Copolymers include materials such as Surlyn, an ionomer based on ethylene with methyl methacrylate and/or methacrylic acid, copolymers of ethylene and vinyl acetate, ethylene and vinyl chloride, ethylene and acrylic acid and ethylene and 4-methylpentene-1, and mixtures include, for example, polyethylene with polyvinyl chloride.

In the drawing, there is set forth a diagrammatic sketch of apparatus suitable for extrusion laminating polyolefin to a web of polyurethane foam peeled from a bun in accordance with the procedures of Buff et al. The peeled web is unwound from roll 10 and passed between and over guide rolls 11 and 12 and 13. The web is coated with a continuously extruded sheet of molten polyolefin, directly from extruder die 20. The coated web passes immediately between the nip of the two rolls 15 and 16 where the foam web 23 and the polyolefin coating 24 are pressed together and simultaneously cooled. Roll 15, which makes direct contact with the polyolefin film, rotates on a fixed axis, is water cooled and has polytetrafluoroethylene-coated steel surface which may be polished or matted or otherwise engraved. The back-up roll 16 is pressure-actuated by means not here indicated so as to apply the desired pressure against roll 15, thus aiding the bonding together of the polyolefin and the urethane foam. Back-up roll 16 has a smooth steel or hard rubber surface. If desired, it can be identical in construction to chill roll 15 and can also have a coolant flowing beneath its surface. The laminated structure 23, 24 is next passed over an additional steel surfaced chill roll 27 and then wound onto a wind-up roll 30 driven by drive means, not shown. The temperature of chill rolls 15 and 27 is generally maintained in the range of from about 20° to 80° C in order to cool the laminate so that it can be wound on to roll 3 without the polyolefin film adhering to the underside of the foam.

Pressure between the nip rolls 15 and 16 is regulated so that an intimate bond can be formed between the polyolefin film and the foam but the structure of the foam is not damaged. Pressures up to about 100 psi can be employed between rolls 15 and 16.

Generally, regardless of the type of foam used, i.e., closed cell, open cell, or even reticulated foam, the polyethylene film remains on the surface without flowing into and through the cellular structure of the foam. If it is desired to coat both sides of the urethane foam, a second extruding station can be placed downstream of that shown in the drawing, so that a second film of polyolefin is extruded and the second side of the foam web is laminated thereto after passing through a second pair of nip rolls. Alternatively, a second extrusion die is placed in parallel to the first shown in the drawing so as to deposit a second layer of polyethylene between the film 23 and the roll 16. In this alternative, roll 16 should also be a chill roll and will have the same construction as roll 15. The same pressure-actuating mechanism can also be used.

EXAMPLE 1

The foam used in this example is prepared from a toluene diisocyanate (isomeric mixture) and a propoxylated glycerol. The foam was formed into a bun according to the procedure of Buff et al. and then peeled into a strip and rolled onto the unwind roll 10. A commercial 1½-inch single-screw extruder of 24:1 L/D and 3:1 compression ratio was equipped with a flat film die of 24 inches width, adjusted to 0.01 inches (10 mils) slit depth. The extruder barrel temperature zones were set as follows: Zone 1 (feed), 480° F; zone 2, 490° F; and zone 3, 500° F; there was essentially no temperature override during operation, which was at 30 rpm screw speed. The die temperature was maintained at 500–510° F.

Coating grade low density (0.916, average) polyethylene, having a nominal melt index of 8 and containing about 0.1 percent by weight of a substituted phenolic antioxidant, was fed to the extruder at a rate sufficient to maintain a lamination linear rate of 84 ft. per minute, at a pre-lamination draw-down to three-fourths mil film thickness. The hot, drawn film was deposited onto a 93 mil-thick polyether polyurethane foam. The nozzle was maintained within 2 inches of the foam.

In one run, the lamination was carried out in the absence of pressure rolls at the mating point of foam and film; the laminate was stable, but showed only about 0.3 psi bonding strength, as measured on an Instron. The film was extruded onto the foam and immediately passed between pressure rolls at 25 psi, the bond strength was about three times greater.

EXAMPLE 2

From the same equipment used in Example 1, there was extruded an extrusion grade of polyvinyl chloride onto the polyether type of polyurethane foam of Example 1. The screw compression ratio was 2¾; the screw speed was 34 rpm; the barrel zone temperatures were 300°, 310°, and 325° F; the die temperature was 330°–340° F, and the slit width (thickness of undrawn film) was 60 mils. The polymer feed rate and wind-up (lamination) rate were maintained to give a draw-down to 4 mils film thickness. Samples were prepared with and without using a pressure roll.

A control sample was prepared from a pre-formed film of polyvinyl chloride and the foam in accordance with the process of U.S. Pat. No. 3,223,568 to Alderfer. The polyvinyl chloride film was placed under light tension, heated from below by infra-red lamps and then immediately placed onto the foam and the laminate was passed through the same pressure rolls as above. The inter-laminar bond strengths were tested; both of the laminates prepared in accordance with the present invention showed greater bond strength than the Alderfer material, even though the first was prepared without the use of a pressure roll.

EXAMPLE 3

In the following example, a conventional one shot urethane polymer foam is prepared from a toluene diisocyanate (isomeric) mixture and an adipate-diethylene glycol polyester (reported to have a hydroxyl number of 5.18, an acid number of less than 1.0 and a viscosity at 25° C of 18,000 cp.) The foam was formed into a bun according to the procedure of Buff et al. and then peeled into a strip 25 mils thick and rolled onto the unwind roll 10.

A commercial 3.5 inch diameter single-screw extruder of 24:1 L/D having its five zone temperatures each set at 600° F was equipped with a flat film die having a slit length of about 76 inches and a slit width (undrawn film gauge) set at 20 mils; the die temperature was also maintained at 600° F. At a screw speed of 75 rpm, about 10 lbs./hr. of commercial polyethylene, containing a phenolic antioxidant (Rexene 171 grade) was fed to the extruder; the windup (and therefore lamination rate) of about 100 ft./minute gave a drawn film, just before lamination, about 70 inches wide and 2 mils thick. This was mated hot to the 25 mil polyester polyurethane foam, using the niprolls 15 and 16. Roll 15 was a water-cooled, smooth surfaced roll maintained at about 50° C; it was desired to obtain a smooth surface on the polyethylene film. The other pressure roll 16, had a hard rubber surface. Nip roll pressure was 10 psi.

EXAMPLE 4

A Brabender laboratory model extruder was equipped with a film die of 2-inch slit length and 50 mils width, and a nip roll-windup roll arrangement operating at 10 psi pressure between rolls as shown above. Commercially available black polypropylene pellets, pipe grade of 0.91–0.92 density, at an 0.4g per 10 minute nominal flow rate, slowly extruded at 230° C through this lab system at a draw-down to 10 mils until steady operation is obtainable; the hot 10 mil thick film was then laminated with 60 mil gauge polyester foam polymerized as described in Example 3, but the foam was peeled to a greater thickness. The product is an impact-resistant laminate of adequate bond strength.

EXAMPLE 5

Using the apparatus and 60 mil guage foam of Example 4, laminates are prepared by extruding a blow-molding grade of ethylene/butene-1 copolymer (nominal melt index of 0.35 and density of 0.954). The laminate was formed having a 2-mil thick clear copolymer film on the foam.

EXAMPLE 6

Using the apparatus and 60-mil guage foam of Example 4, laminates are prepared by extruding a film grade ethylene/vinyl acetate copolymer (melt index of 7.5 and density of 0.93). The laminate was formed having a 10-mil thick clear copolymer film on the foam.

EXAMPLE 7

Using the apparatus and 60-mil guage foam of Example 4, laminates are prepared by extruding a foamed polystyrene obtained by feeding into the extruder polystyrene beads impregnated with a standard foaming agent. The laminate was formed having ¼-inch thick white, opaque, rigid polyolefin foam laminated to the flexible polyurethane foam.

EXAMPLE 8

The product of Example 3 was compared with a commercially available polyurethane foam-polyethylene film laminate that was made by adhesive bonding. In each case, the foam surface was not completely covered by film but uncovered foam areas were present on either side of the film lamina.

a. Interlamina Bond Strength: Test specimens of the two samples were placed side-by-side in the jaws of a Table Model Instron Tester to measure the force required to peel the two lamina (film-foam) apart at their interface. Both peeled apart at pulls too low to be accurately measurable (0.5 vs 1.0). The extrusion laminate of Example 3, according to this invention, failed primarily in the foam, i.e., the foam was torn apart. The adhesive laminate failed at the interface, i.e., the adhesive bond failed.

b. Solvent Resistance: Additional test specimens of the same samples are immersed overnight in chloroform, then air-dried for 24 hours in a hood. The adhesive laminate has started to separate during the immersion period, while the extrusion laminate did not.

c. Light Stability: Several test specimens of the laminate of Example 3 and of the commercial laminate are placed adjacent to each other, film side down, and other specimens of each are placed film side up, in a laboratory space exposed to normal laboratory light. The discoloration of the foam surfaces opposite the film and of the uncovered foam surfaces on the film side of the laminate was observed. The yellow discoloration on the commercial laminate was found to be more severe in all cases. Other test specimens were placed film side up, and others film side down, in a standard fadeometer. The five hour fadeometer test showed an even greater difference in discoloration between the two laminates.

d. Atmospheric Stability: Test specimens of the laminate of Example 3 and of the commercial laminate were exposed to the air but protected from exposure to light. The laminates of Example 3 were substantially unchanged after 2 weeks, including the areas not covered by the film. The uncovered portions of the foam in the commercial laminate specimens turned yellow in that same period.

In addition to carrying out the present invention utilizing an extrusion die, other methods of spreading a molten or semi-molten film of a polyolefin on to the foam can be utilized. For example, a coating apparatus including a coating doctor blade is especially useful when preparing thicker coatings of polyolefin, as when making rigid products. A curtain coating process can be used when utilizing low melting copolymers, especially with ethylene/vinylacetate copolymer. Curtain coating is readily adaptable to coating irregular geometric shapes, such as square or rectangular blocks of polyurethane foam.

To make the coating breathable, such as would be useful as insulation for clothing when the polyolefin is laminated to a completely reticulated open type foam, the laminated structure can be passed, film side up, beneath a pinwheel to mechanically open the film or the polyethylene film can be mixed with a soluble material which then can be leached out either with water or other solvent, after the lamination is formed, leaving a porous surface.

The extrusion procedure for carrying out this invention is preferred but the process described above is exemplary only and other methods known to the art for spreading molten polyolefin resin onto a substrate can also be used.

I claim:
1. A process for laminating an olefin polymer selected from the group consisting of
   a. homopolymers and copolymers of alpha-olefins containing from two to nine carbon atoms, styrene, or vinyltoluene, and halogen-substituted derivatives thereof;
   b. copolymers of mixtures comprising at least 60 percent by weight of olefins selected from the group consisting of alpha-olefins containing from two to nine carbon atoms, styrene, and vinyltoluene; and halogen-substituted derivatives thereof; and up to 40 percent of a copolymerizable monomer selected from the group consisting of acrylic acid, esters of acrylic acid, methacrylic acid, esters of methacrylic acid, and vinyl esters; and
   c. mixtures of (a) and (b) to a polyurethane foam comprising fusing the olefin polymer, flowing the fused polymer onto a surface of a polyurethane foam substrate, and cooling to solidify the polymer on the substrate and form a tightly adhering laminate.

2. The process of claim 1 wherein the fused polymer is flowed through an extrusion die and then onto the surface of the substrate.

3. The process of claim 2 wherein the polymer is extruded in the shape of a sheet onto the surface of the substrate and forms a uniform protective layer to protect the substrate from degradation due to oxidation and light.

4. The process of claim 3 wherein the foam is at a temperature not substantially greater than ambient.

5. The process of claim 3 wherein the foam substrate is a thin web and comprising, in addition, continuously passing a web of foam adjacent the extrusion die to pick up the sheet of olefin polymer and applying pressure to the layers of foam and polyolefin while cooling, to aid in the formation of a tight bond between the two layers.

6. The process of claim 5 wherein the pressure on the foam web and polymer sheet is applied by two nip rolls between which the two layers are passed.

7. The process of claim 6 wherein at least one of the nip rolls is a chill roll cooled by passing coolant fluid therethrough.

8. The process of claim 5 wherein a second layer of olefin polymer is extruded onto a second surface of the foam web.

9. The process of claim 5, wherein the web is at least about 0.035 in. thick.

10. The process of claim 1 wherein the olefin polymer is polyethylene.

* * * * *